(12) United States Patent
Smets et al.

(10) Patent No.: US 7,422,157 B2
(45) Date of Patent: Sep. 9, 2008

(54) PAYMENT CARD SIGNAL CHARACTERIZATION METHODS AND CIRCUITS

(75) Inventors: Patrick Smets, Nijlen (BE); Eddy Lodewijk Hortensia Van De Velde, Leuven (BE); Duncan Garrett, London (GB)

(73) Assignee: MasterCard International Incorporated, Purchase, NY (US)

( * ) Notice: Subject to any disclaimer, the term of this patent is extended or adjusted under 35 U.S.C. 154(b) by 168 days.

(21) Appl. No.: 11/182,358

(22) Filed: Jul. 15, 2005

(65) Prior Publication Data

US 2006/0022045 A1 Feb. 2, 2006

Related U.S. Application Data

(60) Provisional application No. 60/588,270, filed on Jul. 15, 2004.

(51) Int. Cl.
G06K 7/00 (2006.01)

(52) U.S. Cl. .................. 235/486; 235/451

(58) Field of Classification Search .......... 235/486, 235/380, 451, 487, 492
See application file for complete search history.

(56) References Cited

U.S. PATENT DOCUMENTS

| | | | | |
|---|---|---|---|---|
| 4,066,873 A | 1/1978 | Schatz | ............ | 235/487 |
| 4,697,073 A | 9/1987 | Hara | ............ | 235/487 |
| 5,225,977 A | 7/1993 | Hooper et al. | ............ | 364/401 |
| 5,466,919 A | 11/1995 | Hovakimian | ............ | 235/380 |
| 5,511,114 A | 4/1996 | Stimson et al. | ............ | 379/114 |
| 5,623,552 A | 4/1997 | Lane | ............ | 382/124 |
| 5,748,737 A | 5/1998 | Daggar | ............ | 380/24 |
| 5,808,558 A * | 9/1998 | Meek et al. | ............ | 340/870.01 |
| 5,880,452 A | 3/1999 | Plesko | ............ | 235/472 |
| 6,010,074 A | 1/2000 | Kelly et al. | | |
| 6,028,920 A | 2/2000 | Carson | ............ | 379/114 |
| 6,112,981 A | 9/2000 | McCall | ............ | 235/380 |
| 6,119,940 A | 9/2000 | Klug | | |
| 6,240,515 B1 | 5/2001 | Carnegie et al. | | |
| 6,315,195 B1 | 11/2001 | Ramachandran | ............ | 235/380 |
| 6,318,633 B1 | 11/2001 | Drexler | ............ | 235/454 |
| 6,369,719 B1* | 4/2002 | Tracy et al. | ............ | 340/870.02 |
| 6,394,346 B1* | 5/2002 | Bonneau et al. | ............ | 235/438 |
| 6,577,229 B1 | 6/2003 | Bonneau et al. | | |
| 2001/0001856 A1 | 5/2001 | Gould et al. | ............ | 705/39 |
| 2001/0024157 A1 | 9/2001 | Hansmann et al. | | |
| 2001/0034565 A1 | 10/2001 | Leatherman | | |
| 2002/0046116 A1 | 4/2002 | Hohle et al. | ............ | 705/14 |
| 2002/0046117 A1 | 4/2002 | Marion | | |
| 2002/0199054 A1 | 12/2002 | Akahane et al. | | |
| 2003/0167207 A1 | 9/2003 | Berardi et al. | | |
| 2004/0068472 A1* | 4/2004 | Sahota et al. | ............ | 705/64 |

FOREIGN PATENT DOCUMENTS

| | | |
|---|---|---|
| EP | 1460592 | 8/2004 |
| JP | 2001-076117 | 3/2001 |
| WO | WO 92/16913 | 1/1992 |

* cited by examiner

*Primary Examiner*—Daniel St. Cyr
(74) *Attorney, Agent, or Firm*—Baker Botts L.L.P.

(57) ABSTRACT

A reference reader is provided for testing contactless electronic payment cards whose data transmissions are via weak load modulated RF carrier signals. The reference reader includes a reader antenna and a coupled common mode rejection circuit. The common mode rejection circuit is configured to demodulate carrier signals received at the reader antenna to retrieve payment card data signals having low modulation indices.

3 Claims, 6 Drawing Sheets

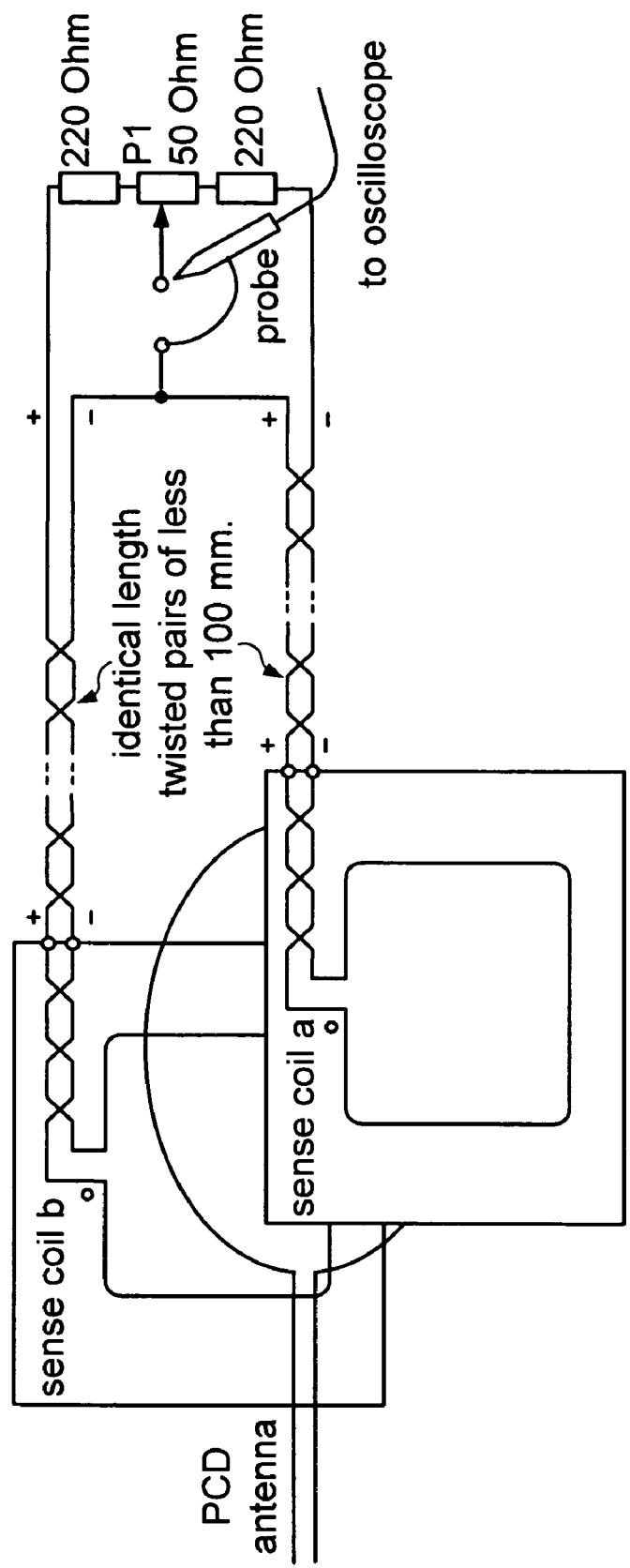
FIG. 1. Test set-up

| Common parameters | Power Supply: 13.56 MHz, inductive coupling Field strength: 1.5...7.5 A/m |
|---|---|
| Type A: 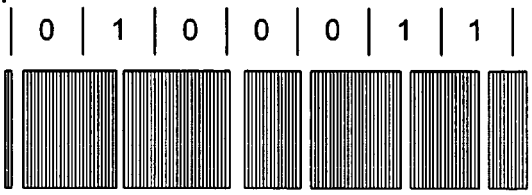 | Downlink: ASK 100%, modified Miller Code, 106 kBit/s<br>Uplink: Load modulation with 847 kHz Subcarrier ASK-modulated, Manchester Code, 106 kBit/s<br>Anticollision: Binary search tree |
| Type B: 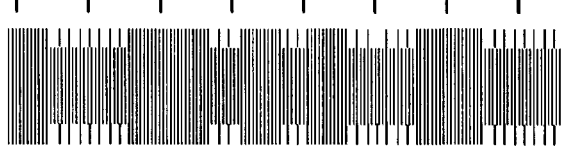<br>phaseshift Φ = +/- 180° | Downlink: ASK 10%, NRZ Code, 106 kBit/s<br>Uplink: Load modulation with 847 kHz Subcarrier BPSK (bi-phase shift keying) modulated, NRZ Code, 106 kBit/s<br>Anticollision: Slotted Aloha |

FIG. 2

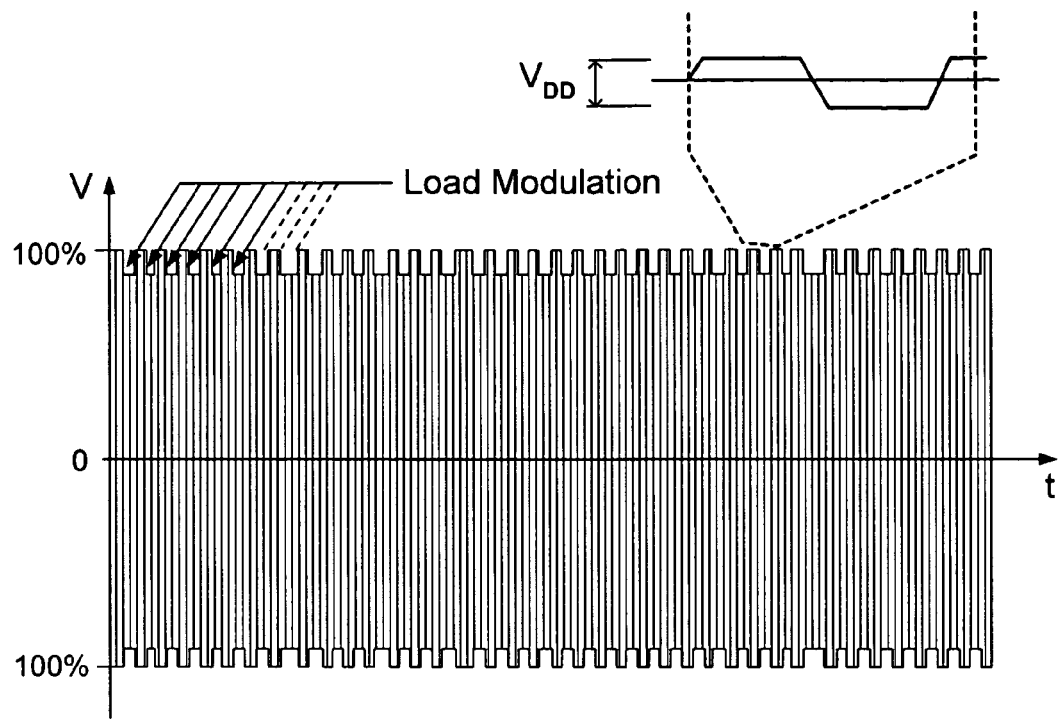
F I G. 3 Load Modulation of carrier RF signal by payment card (PICC)
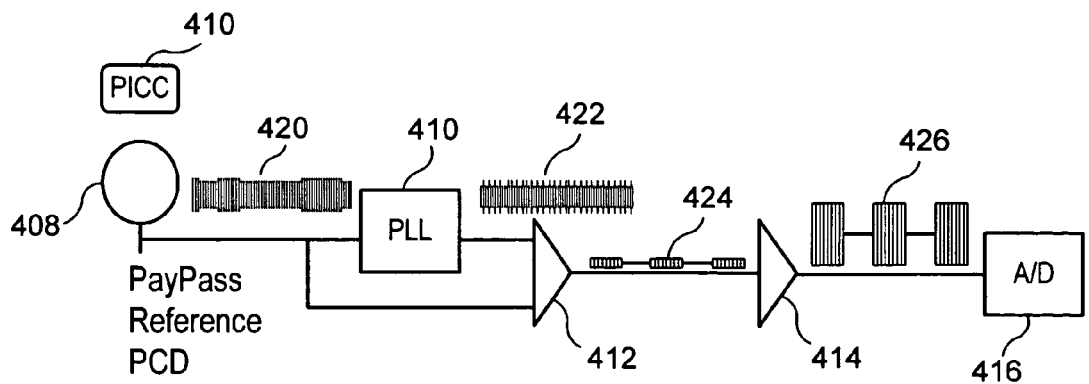
F I G. 4. Block Diagram of CMR

PAYMENT CARD SIGNAL CHARACTERIZATION METHODS AND CIRCUITS

CROSS-REFERENCE TO RELATED APPLICATIONS

This application claims the benefit of U.S. provisional patent application No. 60/588,270 filed on Jul. 15, 2004. This application is also related to U.S. patent applications Ser. Nos. 11/182,354, 11/182,355, 11/182,356 and 11/182,357 co-filed on even date, all of which claim the benefit of the aforementioned patent application No. 60/588,270. All of the aforementioned patent applications are hereby incorporated by reference herein in their entireties

BACKGROUND OF THE INVENTION

Radio Frequency Identification (RFID) tags are small integrated circuits (ICs) connected to an antenna, which can respond to an interrogating RF signal with simple identifying information, or with more complex signals depending on the size of the IC. RFID technology does not require contact or line of sight for communication. Radio Frequency Identification (RFID) technology is now economically viable and is deployed in more and more commercial and industrial applications. For example, RFID technology is now widely used for tags on items in warehouses, shops, ID or access cards, etc. In addition, RFID technology has been introduced in the payment card industry (e.g., by MasterCard, American Express and Visa) in the form of "contactless" payment or credit cards embedded with RFID tags. These contactless payment cards can be used to make electronic payment transactions via radio communication with an RFID-enabled payment terminal. The contactless payment cards can provide consumers with simple, fast and convenient ways to pay for goods and services, for example, in retail establishments, stores or supermarkets.

Several RFID technologies are available for use in contactless payment cards and card readers/terminals. The basic components of a contactless system are the contactless reader (or Proximity Coupling Device (PCD)) and a transponder. The contactless reader is an antenna connected to an electronic circuit. A transponder consists of an inductive antenna and an integrated circuit connected to the ends of this antenna. The combination reader-transponder behaves as a transformer. An alternating current passes through a primary coil (reader antenna) that creates an electromagnetic field, which induces a current in the secondary coil (transponder antenna). The transponder converts the electromagnetic field (or RF field) transmitted by the contactless reader (PCD) into a DC voltage by means of a diode rectifier. This DC voltage powers up the transponder's internal circuits. The configuration and tuning of both antennas determines the coupling efficiency from one device to the other. The transponders may be the contactless payment cards.

For contactless payment card systems to be economically viable and to gain commercial acceptance, the contactless payment cards must be interoperable at all or most RFID-enabled payment terminals, even when the cards and terminals have technological features that are proprietary to specific card providers/issuers, vendors or terminal manufacturers. Industry-wide interoperability is desirable. Towards this end, industry standards organizations and groups (e.g., International Organization for Standards (ISO) and International Electro Technical Committee (IEC)) have formulated voluntary industry standards for implementation of contactless payment technologies. Three such exemplary standards which have been defined by ISO/IEC are the ISO/IEC 10536, ISO/IEC 14443, and ISO/IEC 15693 standards applicable to Close Coupling, Proximity and Vicinity cards, respectively.

The ISO/IEC 14443 proximity card standards (ISO 14443) have been used for several contactless card deployments worldwide. The targeted range of operations for ISO 14443 proximity cards is up to 10 cms, although this range varies depending on power requirements, memory size, CPU, and co-processor.

The ISO 14443 standards document has four distinct parts:

Part 1: Physical Characteristics, defines the physical dimensions for a Proximity Integrated Circuit Card (PICC). The card is the ID-1 size (85.6 mm×54.0 mm×0.76 mm). This is the same size as a bank credit card.

Part 2: Radio Frequency Power and Signal Interface, defines key technical characteristics of the contactless IC chips, including items such as frequency, data rate, modulation, and bit coding procedures. Two variations are detailed in Part 2, the Type A interface and the Type B interface. Both operate at the same frequency and use the same data rate, but they differ from one another in the areas of modulation and bit coding.

Part 3: Initialization and Anti-collision. Initialization describes the requirements for proximity coupling device (PCD) (i.e., the reader) and the card to establish communication when the card is brought into the reader's radio frequency (RF) field. Anti-collision defines what happens when multiple cards enter the magnetic field at the same time, identifying how the system determines which card to use in the transaction and ensuring that all cards presented are inventoried and processed.

Part 4: Transmission Protocols, defines the data format and data elements that enable communication during a transaction.

For a system of contactless payment cards and card readers to be compliant with ISO 14443, they must meet the requirements of at least some of parts of the voluntary standard. In addition to contactless technologies that are standardized under ISO 14443, a number of proprietary contactless interfaces are also used in the industry (e.g., Cubic's GO-Card and Sony's FeliCa card). With existing card technology deployments, interoperability can be an issue. Card readers deployed by vendors in the marketplace should preferably accommodate several different card types. For example, a desirable card reader would support ISO 14443 Type A and Type B cards, ISO 15693 cards and any additional proprietary card types.

Interoperability issues can arise even with card deployments that are presumably compliant with a single ISO standard (e.g., ISO 14443). In the ISO 14443 standard, all requirements or specifications related to RF Power and signal interfaces in the contactless card and reader system (i.e., the physical layer in an Open System Interconnection (OSI) model view of the system) are defined using separate standardized tests for cards and for readers. The ISO/IEC 10373 Standard Part 6 (ISO 10373-6) deals with test methods, which are specific to contactless integrated circuit card technology (proximity card). Compliance of contactless cards and readers to ISO 14443 is verified using reference devices. According to ISO 10373-6, a set of "reference" cards (i.e., Reference PICC), which represent the characteristics of contactless cards, is used for measuring specification compliance of a contactless reader. (See, e.g., FIG. 1a). For example, the Reference PICC is used to test the magnetic field produced or transmitted by a PCD, and to test the ability of the PCD to power a PICC. Similarly, a "reference" reader (i.e., a Test or Reference PCD), which may represent the characteristics of a typical contactless reader, is used for measuring specification compliance of contactless cards. For example, the Reference PCD in conjunction with a pair of external sense coils is used to test the load modulation that is generated by cards during testing.

While the separate card and reader compliance test procedures under ISO 10373-6 may ensure that deployed product devices individually have characteristics that fall in either the designated specification ranges for cards or readers, the procedures do not ensure interoperability in the field. Cards and/or readers verified as compliant may be only marginally so (e.g., by having a characteristic value at the end or edge of a designated specification range). This manner of standards compliance can lead to operational failure in the field. For example, a marginally compliant card may be unreadable or difficult to read using a card reader that is also only marginally compliant.

Further, with respect to verifying important data transmission and reception of functions of contactless devices, ISO 10373-6 makes provisions for only indirect measurements of the load modulated data signals generated by cards. A PCD Test Assembly prescribed by ISO 10373-6 for testing product cards has a pair of sense coils that are external to the reference PCD reader. These external sense coils are utilized to measure the load modulated data signal generated and transmitted by card under test. (See e.g., FIG. 1). However, there is no direct or obvious relation between the load modulated signal measured by the sense coils and the signal that is physically received by the reference PCD antenna. Therefore, testing of data transmission functions of a product card using the external sense coils does provide direct assurance that a putatively ISO compliant product card's modulation of data signals is sufficient or compatible with a product reader's ability to receive or process the modulated data signals properly.

Consideration is now being given to ways of enhancing interoperability of electronic payment devices that are used in contactless electronic payment systems. Attention is directed to reducing variations in card and reader properties consistent with commonly accepted standards. In particular, attention is directed to improving specification compliance procedures and test equipment to enhance interoperability of payment devices.

SUMMARY OF THE INVENTION

The present invention provides signal characterization methods for testing the data transmission and reception functions of interacting payment cards and readers used in electronic payment systems. The signal characterization methods utilize a CMR circuit to demodulate carrier signals that are received by a reader antenna, and to thereby accurately recover small amplitude data signals transmitted by the cards. Analysis of the card data signals received at the reader antenna will provide a more accurate characterization of card data transmission functions than prior art methods, which use external sense coils as a proxy for the reader antenna.

In exemplary contactless payment card technology implementations such as PayPass, the CMR circuit is provided in the Reference PCD reader device designated for testing product payment card functions. The CMR circuit and the Reference PCD reader antenna both may be fabricated on a common circuit board.

Further features of the invention, its nature and various advantages will be more apparent from the accompanying drawings and the following detailed description.

BRIEF DESCRIPTION OF THE DRAWINGS

FIG. 1 is an illustration of a reference reader test assembly, which includes a pair of external sense coils for measuring small amplitude data signals generated by a payment card, in accordance with ISO 10373-6.

FIG. 2 is a schematic illustration of carrier signal modulation schemes for data transmission between contactless payment cards and readers, which are prescribed by the ISO 14443 Standard.

FIG. 3 is schematic illustration of a low modulation index data signal generated by a payment card.

FIG. 4 is block diagram of a common mode rejection (CMR) circuit coupled to a reference reader antenna, in accordance with the principles of the present invention. The CMR circuit is configured to demodulate carrier signals received at the antenna to extract data signals transmitted by a payment card under test.

DETAILED DESCRIPTION OF THE INVENTION

Figure 5A:
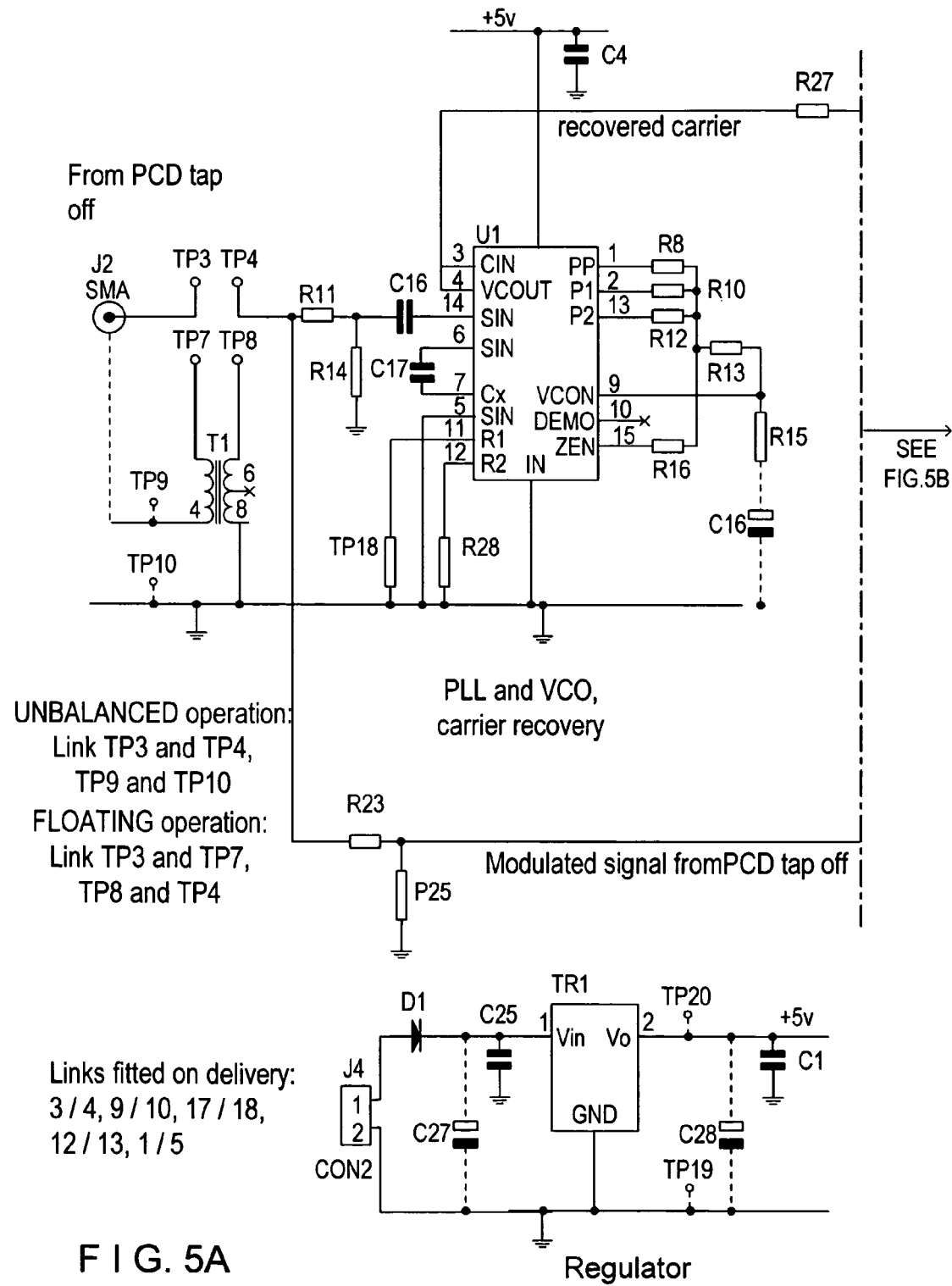
FIG. 5 is a circuit diagram of an exemplary CMR circuit coupled to a reference reader antenna, in accordance with the principles of the present invention.

Signal characterization methods for testing data transmission and reception functions of interacting payment cards and readers that are used in contactless electronic payment systems are provided. The signal characterization methods utilize a CMR circuit to demodulate carrier signals that are received by a reader antenna and to recover the load modulated data signals transmitted by the cards. The load modulated data signals may have substantially small amplitudes compared to the carrier signal amplitudes. Analysis and measurements of the load modulated data signals received at the reader antenna will provide a more accurate characterization of card data transmission functions than prior art methods, which use external sense coils as a proxy for the reader antenna.

The inventive signal characterization methods and circuits are described herein in the context of implementations of electronic payment systems in which the contactless payment device specifications are intended to conform to a common industry standard such as the ISO 14443 Standard, which further specifies standardized test methods (i.e., ISO 10373-6 Test Methods, Proximity Cards) for verification of the specification of individual contactless payment devices. Recently, assignee MasterCard International Incorporated ("MasterCard") has developed proprietary specifications MasterCard PayPass™ ISO/IEC 14443 Implementation Specification ("PayPass") for implementation of proximity payment card technologies (e.g., by issuers, vendors or manufacturers of cards and card readers). The PayPass implementation is consistent with the ISO 14443 Standard and provides a convenient example illustrating the principles of the present invention. It will be understood that the selection of the PayPass implementation for purposes of illustration herein is only exemplary, and that the principles of the present invention can be more generally applied to electronic payment devices and systems that operate under other common industry or proprietary standards.

In common industry electronic payment systems, which conform to specifications such as the ISO 14443 Standard, power and data between a contactless card reader and a payment card are transmitted via a 13.56 MHz carrier signal. The ISO 14443 Standard calls for payment cards to transmit bit-encoded data at 106 Kbps on an 847.5 kHz square wave sub-carrier. (See FIG. 2). The payment cards superimpose a weak amplitude (or low modulation index) data signal on the reader-generated carrier signal by switching an inductive load in and out of circuit i.e., by load modulation. In most instances of card operation, the modulation amplitude is the range of about a couple of mV up to about 100 mV, which is superimposed on a reader-generated carrier signal that can have amplitudes in the range of about a few volts. The low modulation index, which is typically <1/100 for the load-modulated carrier signal, makes it difficult to extract the card data signal for accurate characterization or measurements. Such accurate characterization or measurements may be necessary for reliably ensuring specification compliance of the data transmitter and for ensuring that the payment devices are interoperable. ISO 10373-6 recommends a technique called Common Mode Rejection (CMR) for extracting the small value load modulation signal from the carrier signal for PICC load modulation testing.

The inventive signal characterization methods for testing the data transmission and reception functions of interacting payment cards and readers also are based on the CMR technique. A CMR circuit is provided in the reference reader (e.g., the PayPass-Reference Reader), which is used for testing card functionality. The reader antenna is connected to an input of the CMR circuit. The CMR circuit processes the modulated carrier signal received at the Reference PCD itself and extracts the small amplitude load modulated data signal from the large amplitude carrier signal.

FIG. 4 shows a block diagram of an exemplary CMR circuit 400, which may be included in the Reference PCD (e.g. a PayPass - Reference PCD, See U.S. patent application S/N 11/182 357). CMR circuit 400 includes a phase locked loop (PLL) circuit 404, a differentiator 404, an amplifier 406, and an optional AID converter 408. An input end of CMR circuit 400 is connected to an output lead of reader antenna 408. PLL circuit 404 is designed to average out small variations in the input signal to produce an output signal, which has stable frequency, phase and amplitude. PLL circuit 404, which includes known elements such as a phase detector and oscillator, may be conveniently designed using known electronics circuit design principles. (See e.g., wiki/phaselocked loop website by wikipedia encyclopedia organization).

In operation, a PICC 410 under test is placed on the landing plate of the PayPass-Reference PCD. PICC 410 under test conditions generates load-modulated data signals superimposed on the 13.56 MHz carrier signal, which is received by antenna 402. PLL 404 processes the received carrier signal 420 to average out the small amplitude small variations in the received signal 420 to generate a "carrier-replica" signal 422 which is an accurate replica of the unpopulated 13.56 MHz carrier signal (i.e. without the load modulation by the card). The carrier-replica signal 422 and the received signal 420 are fed into a differentiator 404, which subtracts the former signal from the latter signal to accurately reproduce the small amplitude data signal 424 generated by the PICC 410 under test conditions. Data signal 424 may then be further amplified by amplifier 414, and displayed directly on an oscilloscope for graphical measurements or processed through an optional analog-to-digital converter 416 prior to measurement or analysis.

The inventive signal detection methods and circuits may be used in conjunction with the systems and methods disclosed in co-pending U.S. patent application S/N 11/182,354 for enhancing the interoperability of contactless payment devices (i.e., product cards issued to consumers and product readers deployed by merchants). The disclosed systems and methods ensure that individual product cards and readers operate or function in tighter specification ranges than they are permitted to operate in under the ISO 14443 standard. The systems and methods involve cross-calibrating the reference devices (e.g., PayPass-Reference PICC and PayPass-Reference PCD devices disclosed in co-pending U.S. patent application S/N 11/182,357), which are used to test specification compliance of individual product readers and cards under the ISO 14443 and ISO 10373-6 standards. The Reference PCD is used to establish a range of observed functional behaviors or parameters ("nominal card range") of the Reference PICC. Product card readers are required to have functional behaviors or parameters that are within this nominal card range as measured by the Reference PCD. Conversely, a Reference PICC is used to establish a range of observed functional behaviors or parameters ("nominal reader range") of Reference PCDs. Product readers are required to have functional behaviors or parameters that are within the nominal reader range when reading the reference card.

Exemplary procedures for ensuring data transfer interoperability of product contactless payment devices, may involve the following steps:
  (a) testing data reception (e.g., load modulation sensitivity) by a PCD by generating different signals through the Reference PICC. The PayPass-Reference PICC is first calibrated with respect to the Reference PCD to determine the levels and characteristics of the different signals generated by the Reference PICC, and
  (b) measuring the data transmission by a PICC on the Reference PCD, with the Reference PCD sending "average" value commands to the PICC and with the Reference PCD providing an "average" power level. Both the power level and the command characteristics produced by the Reference PCD are calibrated with respect to the Reference PICC.

Provision of a CMR circuit coupled to the reader antenna in the Reference PCD provides direct access to the PICC data signals as received by readers, and hence leads to more accurate measurements of the data transmission functions of PICC devices. The CMR circuit may be provided along with other electronic circuits in the PayPass-Reference PCD device, which is designed for testing a payment card that can be used with any of several card readers deployed in an electronic payment system. The PayPass-Reference PCD electronic circuits are configured to exhibit external behavior, which is representative of the behaviors of the several readers and interacting cards deployed in an electronic payment system. The electronic circuits include a printed circuit board antenna of about 7 mm diameter, which is resonant at 13.56 MHz.

Figure 5B:
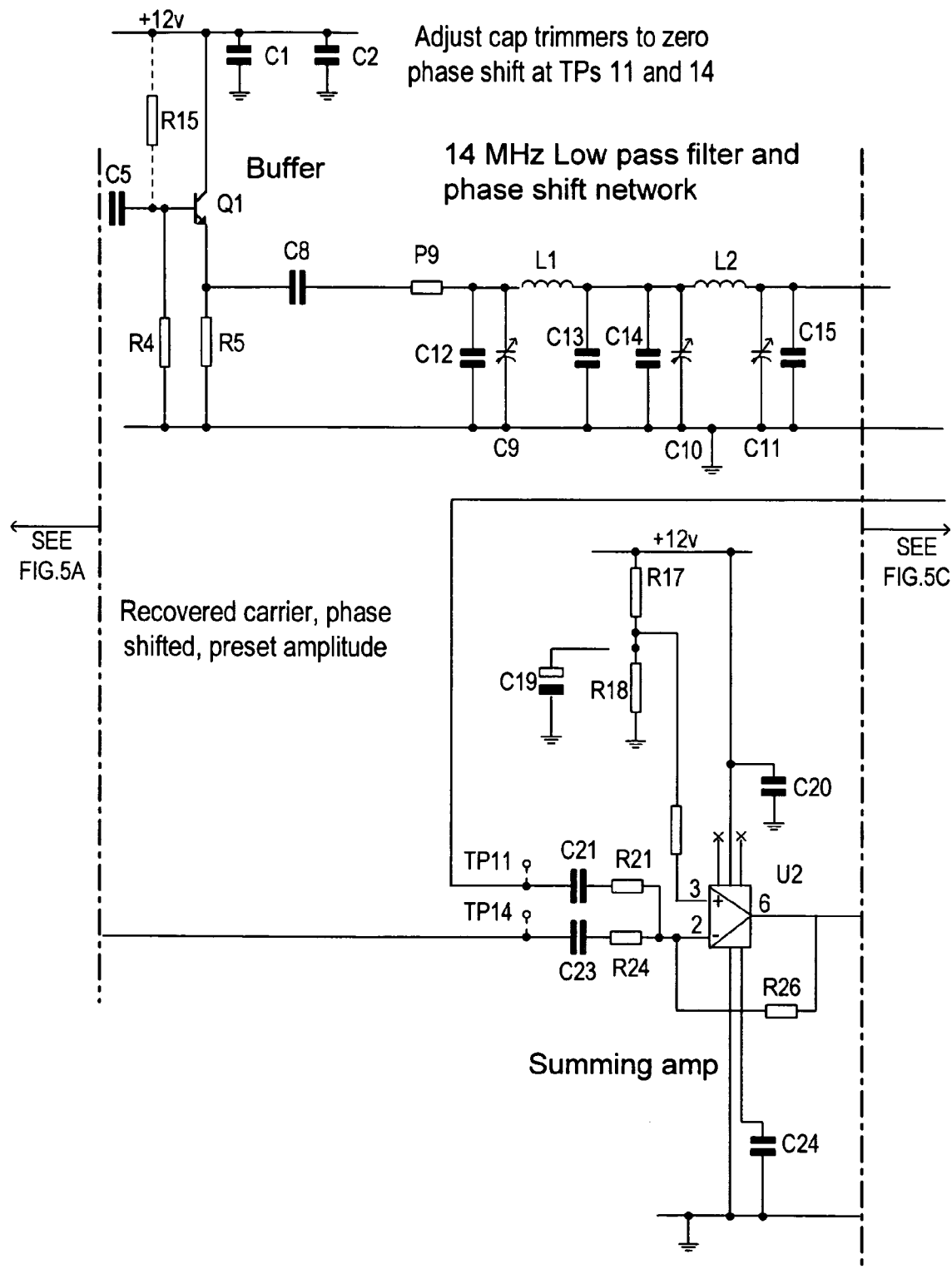
Figure 5C:
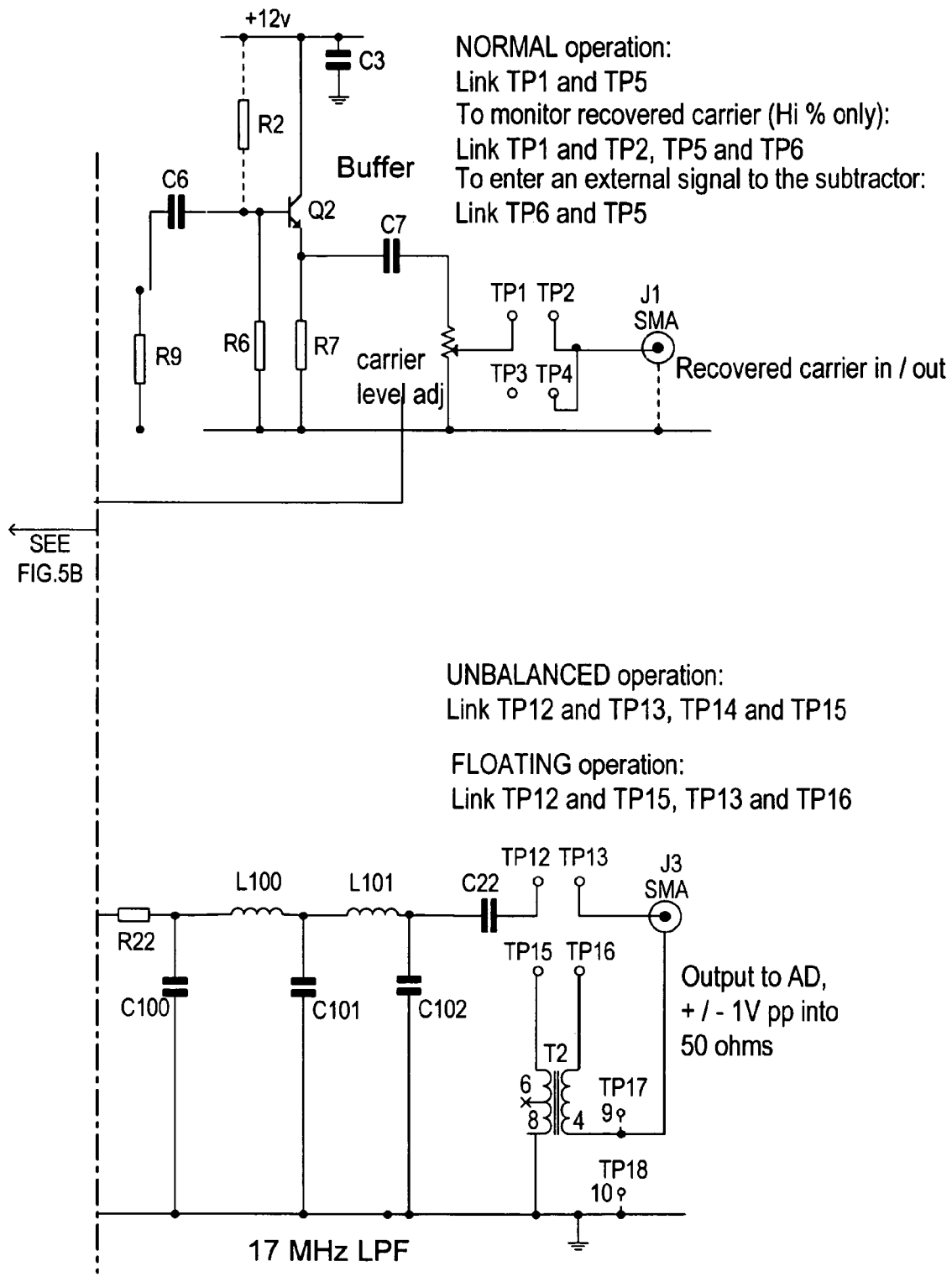

FIG. 5 shows a circuit diagram of an exemplary CMR circuit 500 which may be used with the PayPass-Reference PCD antenna to isolate the weak signal created by PICC modulation. In operation, the signal from the PCD antenna input to CMR circuit 500 might be an approximately 1 $V_{pp}$ 13.56 MHz carrier wave, which is amplitude modulated. The modulating card data signal is an 847.5 KHz square wave subcarrier. As the modulation index is very low, CMR circuit 400 reduces the residual carrier amplitude significantly (e.g. by approximately 40 dB), which effectively increases the modulation index of the received signal by the same amount, so that the 847.5 KHz data signal can be sampled in a practical and useful manner. The sampling and measurements may be effectively performed by an analog-to-digital converter, which may be a standalone unit or built into an oscilloscope as desired.

While the present invention has been particularly described with reference to exemplary embodiments thereof, it will be understood by those skilled in the art that various modifications and alterations may be made without departing from the spirit and scope of the invention. Accordingly, the disclosed embodiments of the invention are considered merely illustrative, and the invention is limited in scope only as specified in the appended claims.

We claim:

1. A method for testing data transmission functions of contactless payment card that can be used with any of several card readers deployed in an electronic payment system, wherein the payment card transmits data by load modulating a subcarrier of an RF carrier signal, the method comprising the steps of:
    (a) using a reference antenna tuned to the RF carrier signal frequency to receive a load-modulated data signal generated by the payment card;
    (b) using a common mode rejection (CMR) circuit to demodulate the received load-modulated data signal and extract the load modulated subcarrier data signal;
    (c) using the reference antenna to transmit power and data commands from a reference reader to the payment card on RF carrier signal, wherein step (c) comprises using the reference antenna to transmit power that has an average value and transmit data commands that are average value commands to the PICC, and wherein the average values refer to values representative of the behaviors of the several readers and interacting cards deployed in an electronic payment system.

2. The method for claim 1 wherein step (b) of using a CMR circuit to demodulate the received load-modulated data signal and extract the load modulated subcarrier data signal comprises reducing the carrier signal amplitude to increase the modulation index of received signal.

3. The method for claim 1 further comprising step (d) of using an analog-to-digital converter to sample the extracted signal.

* * * * *